(12) United States Patent
Komura (10) Patent No.: US 7,466,847 B2
(45) Date of Patent: Dec. 16, 2008

(54) DRIVER'S APPEARANCE RECOGNITION SYSTEM

(75) Inventor: Takashi Komura, Toyota (JP)

(73) Assignee: DENSO CORPORATION, Kariya (JP)

( * ) Notice: Subject to any disclaimer, the term of this patent is extended or adjusted under 35 U.S.C. 154(b) by 535 days.

(21) Appl. No.: 11/100,497

(22) Filed: Apr. 7, 2005

(65) Prior Publication Data

US 2005/0226472 A1    Oct. 13, 2005

(30) Foreign Application Priority Data

Apr. 13, 2004    (JP) ............................. 2004-117931

(51) Int. Cl.
*G06K 9/00*    (2006.01)
(52) U.S. Cl. .................................... 382/118
(58) Field of Classification Search ................. None
See application file for complete search history.

(56) References Cited

U.S. PATENT DOCUMENTS

| | | | | |
|---|---|---|---|---|
| 5,729,619 | A * | 3/1998 | Puma | 382/115 |
| 6,751,340 | B2 * | 6/2004 | Prokoski | 382/118 |
| 2002/0134835 | A1 * | 9/2002 | Kennedy | 235/384 |

FOREIGN PATENT DOCUMENTS

| | | |
|---|---|---|
| JP | A-H06-32154 | 2/1994 |
| JP | A-10-097691 | 4/1998 |
| JP | A-2000-168502 | 6/2000 |
| JP | A-2000-280780 | 10/2000 |
| JP | A-2002-288670 | 10/2002 |
| JP | A-2003-095067 | 4/2003 |
| JP | A-2003-256813 | 9/2003 |

OTHER PUBLICATIONS

Notice of Reasons for Rejection dated on Jul. 13, 2007 in corresponding Japanese Patent application No. 2004-117931 (and English translation).
www.face-id.jp "Face authentication" by OMRON (Discussed on p. 3 of the spec.), copyright 2004.

* cited by examiner

*Primary Examiner*—Matthew C Bella
*Assistant Examiner*—Alex Liew
(74) *Attorney, Agent, or Firm*—Posz Law Group, PLC (57) ABSTRACT

A driver's appearance recognition system comprises: a camera to capture a driver's face image; a near infrared ray LED to radiate near infrared ray to the driver's face; an LED current control circuit to control the amount of current supplied to the near infrared ray LED; and an image processing circuit to execute an individual authentication process and a closed-eye detection process. When the individual authentication process is executed, it is necessary to increase the illumination intensity during image capture by the camera. For this purpose, a setup current value for the LED current control circuit is set to a high current value. When the closed-eye detection process is executed, the illumination intensity needs to be ensured as much as required for the closed-eye detection process. For this purpose, a setup current value is set to a current value lower than that used for execution of the individual authentication process.

4 Claims, 4 Drawing Sheets

DRIVER'S APPEARANCE RECOGNITION SYSTEM

CROSS REFERENCE TO RELATED APPLICATIONS

This application is based on and incorporates herein by reference Japanese Patent Application No. 2004-117931 filed on Apr. 13, 2004.

FIELD OF THE INVENTION

The present invention relates to a system to recognize driver's appearance using a vehicle driver's face image captured by a camera. For example, the present invention is used for car antitheft systems, usability improvement systems, or accident prevention systems.

BACKGROUND OF THE INVENTION

Conventionally, there are known car antitheft systems, usability improvement systems, and accident prevention systems. As will be discussed below, such systems recognize driver's appearance for individual authentication, closed-eye detection, and the like using vehicle driver's face images captured by a camera.

For example, an individual authentication system using face images extracts a pupil's iris pattern from driver's face images captured by a camera. The system collates the extracted pattern with a previously registered iris pattern (e.g., see Patent Document 1).

When both patterns match, user recognition control means allows an engine to start in order to use the individual authentication for protecting the car against theft. Alternatively, the environment such as in-vehicle units is configured for a user in order to use the individual authentication for improving the usability.

As another technical field, there is known a face authentication system (e.g., see Non-Patent Document 1) to ensure the security management of entry to or exit from rooms such as offices.

In this face authentication system, for example, the user recognition control means uses a camera to capture shading such as face images and identifies the shading as a feature quantity attributed to an individual. The system collates the feature quantity with a previously registered feature quantity to implement the individual authentication. The feature quantity represents shading patterns, the gradient amount of shading changes, and the like, in the vicinity of facial parts.

In a closed-eye detection using face images, for example, closed-eye detection means extracts an eye portion from the face image captured by a camera. The system chronologically detects whether the eye is opened or closed based on the number of pixels between upper and lower eyelids.

The system uses determination means to determine whether or not a driver falls asleep at the wheel based on a detection result from the closed-eye detection means (e.g., see Patent Document 2).

These systems to recognize the user appearance using face images generally have infrared light radiation means such as a light emitting diode. When a camera captures images, the infrared light radiation means radiates infrared light to a user's face.

Patent Document 1: JP-2000-168502A
Patent document 2: JP-H6-32154A
Non-patent Document: "Face authentication" by OMRON.

The present invention relates to a system which can be mounted on a vehicle capable of performing both the above-mentioned individual authentication and closed-eye detection using face images.

In this case, however, some of the above-mentioned individual authentication technologies identify shading in a face image to be feature quantity attributed to individuals. Such technologies cause the following problem.

As mentioned above, the individual authentication and the closed-eye detection using face images both use a camera to obtain face images by radiating infrared light. Accordingly, the camera, the infrared light radiation means, and the like can be shared.

Generally, the infrared light radiation means such as a light emitting diode is used to apply a specified current and provide constant illumination intensity. Current supply means supplies the infrared light radiation means with a constant current to provide specified illumination intensity. For this purpose, the current supply means is previously assigned a current value to be supplied to the infrared light radiation means.

Let us consider a case of mounting the system for performing the individual authentication and the closed-eye detection using face images on a vehicle by sharing the infrared light radiation means. It is necessary to set an electric current value supplied to the infrared light radiation means so that its illumination intensity can comply with the individual authentication requiring high illumination intensity.

The individual authentication requires a higher illumination intensity than the closed-eye detection for the following reason. Feature quantities need to be strictly detected on an individual authentication system that identifies shades in a face image to be the feature quantity attributed to an individual.

However, for example, the feature quantity varies with face images when the light is applied to the entire face and when the west sunlight is applied to a half of the driver's face in the evening. For this reason, the above-mentioned individual authentication system requires somewhat controlled illumination environment so that the constant feature quantity can be obtained from face images.

On the other hand, the closed-eye detection system just requires the illumination intensity so controlled as to be able to capture an eye's outline and detect the eye's inside movement.

Accordingly, when the illumination is radiated to the driver's face for image acquisition, the necessary illuminance is higher for the individual authentication than for the closed-eye detection. For this reason, the infrared light radiation means needs to be supplied with a current value large enough to provide the illumination intensity needed for the individual authentication.

The closed-eye detection aims at preventing drivers from falling asleep at the wheel. Accordingly, the closed-eye detection is always performed while a driver is driving the vehicle.

When the same vehicle is equipped with the system to perform the individual authentication and the closed-eye detection using face images, a large current must be applied to the infrared light radiation means for capturing driver's face images using the camera. The current is continuously applied while the driver is driving the vehicle.

Generally, applying large currents shortens the service life of the infrared light radiation means such as the light emitting diode. When a vehicle is equipped with the system to perform the individual authentication and the closed-eye detection using face images, the service life of the infrared light radiation means becomes short.

Such problem is not limited to the case of equipping vehicles with the system performing the individual authentication and the closed-eye detection. The problem also occurs in a system to perform a plurality of appearance authentications differing in necessary illumination intensities on face images used for the driver's appearance recognition. The problem becomes particularly remarkable for the case of equipping a vehicle with the individual authentication system and the closed-eye detection. That is, the former is a function that needs to strictly detect the face image's feature quantity. The latter is a function that need not strictly detect the face image's feature quantity.

There is known a method of decreasing the amount of current applied to the infrared light radiation means in order to prolong its service life. However, this method is unpreferable because the infrared light radiation means generates low illumination intensity and decreases the detection accuracy during the individual authentication.

SUMMARY OF THE INVENTION

The present invention has been made in consideration of the foregoing. It is therefore an object of the present invention to provide a driver's appearance recognition system which performs a plurality of driver's appearance authentications and is capable of prolonging the service life of infrared light radiation means.

To achieve the above object, a driver's appearance recognition system is provided with the following. A camera is included for capturing a face image of a driver's face. Infrared light radiation means is included for radiating an infrared ray to the driver's face and changing illumination intensity according to the amount of supplied current when the camera captures the face image. Appearance recognition control means is included for, based on a face image captured by the camera, executing a first driver's appearance recognition process to recognize a driver's appearance and a second driver's appearance recognition process different from the first driver's appearance recognition process and for controlling the camera and the infrared light radiation means. Further, current amount control means is included for providing control that a first setup value is defined for a setup value of current supplied to the infrared light radiation means when the appearance recognition control means executes the driver's appearance recognition process and that a second setup value different from the first setup value is defined for a setup value of current supplied to the infrared light radiation means when the appearance recognition control means executes the second driver's appearance recognition process.

When a system does not have control means capable of changing the amount of current to two or more setup values, the current supply means supplies the constant amount of current supplied to the infrared light radiation means. The amount of current is configured so that the illumination intensity for the infrared light radiation means becomes equal to that for a first or second driver's appearance recognition process whichever requires a high illumination intensity.

Let us assume that the system does not have control means capable of changing the amount of current to two or more setup values. Such system supplies a large current to the infrared light radiation means during image capture not only for the driver's appearance recognition process requiring a high illumination intensity, but also for the other driver's appearance recognition process not requiring a high illumination intensity.

By contrast, the present invention can use the current control means to change the amount of current supplied to the infrared light radiation means according to the types of the driver's appearance recognition processes. Accordingly, the present invention can change the illumination intensity for capturing face images through the camera to illumination intensities needed for various types of driver's appearance recognition processes.

For example, let us assume that the first driver's appearance recognition process requires a higher illumination intensity than the second driver's appearance recognition process. When the first driver's appearance recognition process is executed, the present invention can use the current amount control means to increase the amount of current supplied to the infrared light radiation means so as to increase the illumination intensity during the image capture. When the second driver's appearance recognition process is performed, the amount of current supplied to the infrared light radiation means can be made smaller than that for execution of the first driver's appearance recognition process. This aims at ensuring the illumination intensity required for the second driver's appearance recognition process.

An image may be captured for the second driver's appearance recognition process not requiring so high illumination intensity as the first driver's appearance recognition process. In such case, the present invention can decrease the amount of current supplied to the infrared light radiation means compared to the system not having the current amount control means.

As a result, the present invention can extend the service life of the infrared light radiation means compared to the system not having the current amount control means.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

The driver's appearance recognition system according to the embodiment performs individual authentication and closed-eye detection.

Figure 1:
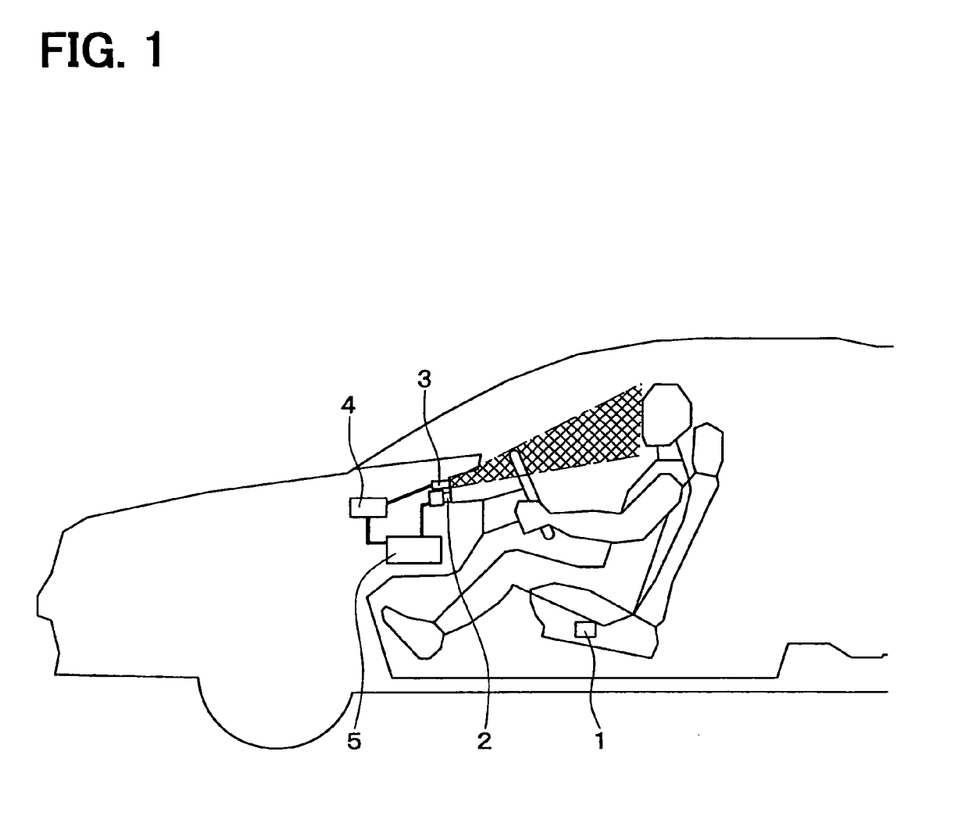
FIG. 1 shows the configuration of a driver's appearance recognition system according to a first embodiment of the present invention.

FIG. 1 shows the configuration of the driver's appearance recognition system according to a first embodiment of the present invention. As shown in FIG. 1, the system comprises a weight detection switch 1 as riding detection means; a camera 2; a near infrared ray light emitting diode 3 as infrared light radiation means; a near infrared ray light emitting diode's current control circuit 4 as current amount control means; and an image processing circuit 5 as appearance recognition control means. In the following description, the near infrared ray light emitting diode 3 is referred to as the near infrared ray LED 3. The near infrared ray light emitting diode's current control circuit 4 is referred to as the LED current control circuit 4.

The weight detection switch 1 detects the presence of a driver and is built in a driver's seat surface. When detecting the driver, the weight detection switch 1 issues a signal notifying this detection to the image processing circuit 5.

The camera 2 is represented as the near infrared ray camera 2, for example, and captures face images of the driver sitting in the driver's seat. The camera 2 is positioned in the car interior so as to be able to capture the face of the driver sitting in the driver's seat. Specifically, the camera 2 is mounted on an instrument panel as shown in FIG. 1 and is placed at a hardly recognizable position far back from the panel front.

The camera 2 can be disposed near a face outlet of an air conditioner at the center of the instrument panel. However, the camera 2 can be appropriately installed at such a position as to capture the driver's face from the front. It is more preferable to position the camera in front of the driver's seat than the center of the instrument panel.

The camera 2 operates by receiving an operation instruction signal from the image processing circuit 5. The camera 2 outputs the driver's face image to the image processing circuit 5.

The near infrared ray LED 3 radiates a near infrared ray to the driver's face. Like the camera 2, the near infrared ray LED 3 is also installed on the instrument panel and is positioned near the camera 2. According to the embodiment, a plurality of near infrared ray LEDs 3 is disposed at both sides of the camera 2.

The plurality of near infrared ray LEDs 3 is disposed at both sides of the camera 2 because a near infrared ray needs to be symmetrically, i.e., evenly radiated to the driver's face.

The near infrared ray LED 3 lights when supplied with current from the LED current control circuit 4. A control circuit (not shown) is used to control the near infrared ray LED 3 so as to light in interlock with a shutter of the camera 2. For example, the camera captures 30 frames of image per second. Accordingly, the near infrared ray LED 3 lights each time the camera 2 acquires one frame of image. That is, the near infrared ray LED 3 starts lighting synchronously with shutter opening and stops lighting synchronously with shutter closing.

The LED current control circuit 4 controls the amount of current applied to the near infrared ray LED 3 and is mounted on a vehicle. The LED current control circuit 4 can switch between a plurality of current values supplied to the near infrared ray LED 3.

The plurality of current values is configured in accordance with functions provided for the image processing circuit 5. The embodiment supplies a high current to the near infrared ray LED 3 when performing the individual authentication. The embodiment supplies a low current to the near infrared ray LED 3 when performing the closed-eye detection. The low-current value is smaller than a current value for the individual authentication and is large enough to provide the illumination intensity for performing the closed-eye detection.

The LED current control circuit 4 receives an instruction signal from the image processing circuit 5 to change setup current values supplied to the near infrared ray LED 3.

The LED current control circuit 4 can also change setup current values so as to fine-tune the illumination intensity of the near infrared ray LED 3 by receiving an instruction signal from the image processing circuit 5.

The fine-tuning is performed when a face image obtained by the camera 2 shows an illumination intensity outside a specified range and the camera 2 obtains another face image as a feedback. That is, the fine-tuning function is performed only when the face image's illumination intensity is too low or high. The fine-tuning function differs from the function to change setup current values in accordance with an individual authentication process or a closed-eye detection process.

The image processing circuit 5 has functions to perform the individual authentication process and the closed-eye detection process. The individual authentication process and the closed-eye detection process are equivalent to two driver's appearance recognition processes.

The image processing circuit 5 is mounted on a vehicle and mainly comprises a DSP (Digital Signal Processor), a CPU, memory, and a voltage conversion circuit.

The DSP receives an operation instruction signal from the CPU, processes a face image input from the camera 2, and performs the individual authentication or the closed-eye detection.

The CPU controls the entire system. That is, the CPU outputs operation instruction signals to the camera 2, the LED current control circuit 4, and the DSP. Based on the operation instruction signals, the LED current control circuit 4 changes the setup current value. The camera 2 obtains a driver's face image and outputs it to the image processing circuit 5. The DSP performs individual verification or closed-eye detection.

The memory temporarily stores a face image input from the camera 2. The memory previously stores driver's feature quantity used for the individual authentication. During the individual authentication, for example, the DSP processes the face image temporarily stored in the memory to detect the feature quantity. The DSP collates the detected feature quantity with the driver's feature quantity previously stored in the memory.

The voltage conversion circuit converts a voltage supplied from a battery into a necessary voltage. Via the voltage conversion circuit, the battery supplies necessary voltages to the camera 2, the near infrared ray LED 3, the LED current control circuit 4, the CPU of the image processing circuit 5, the DSP, and the like.

Though not shown, the image processing circuit 5 is so configured that the weight detection switch 1 inputs passenger detection signals to the CPU. When a door changes from a lock state to an unlock state, the ECU (not shown) inputs a signal notifying this state change. In this case, the image processing circuit 5 becomes standby. Further, the weight detection switch 1 may input a passenger detection signal. In this case, the image processing circuit 5 allows the CPU to output start instruction signals to the camera 2, the LED current control circuit 4, and the DSP.

Figure 2:
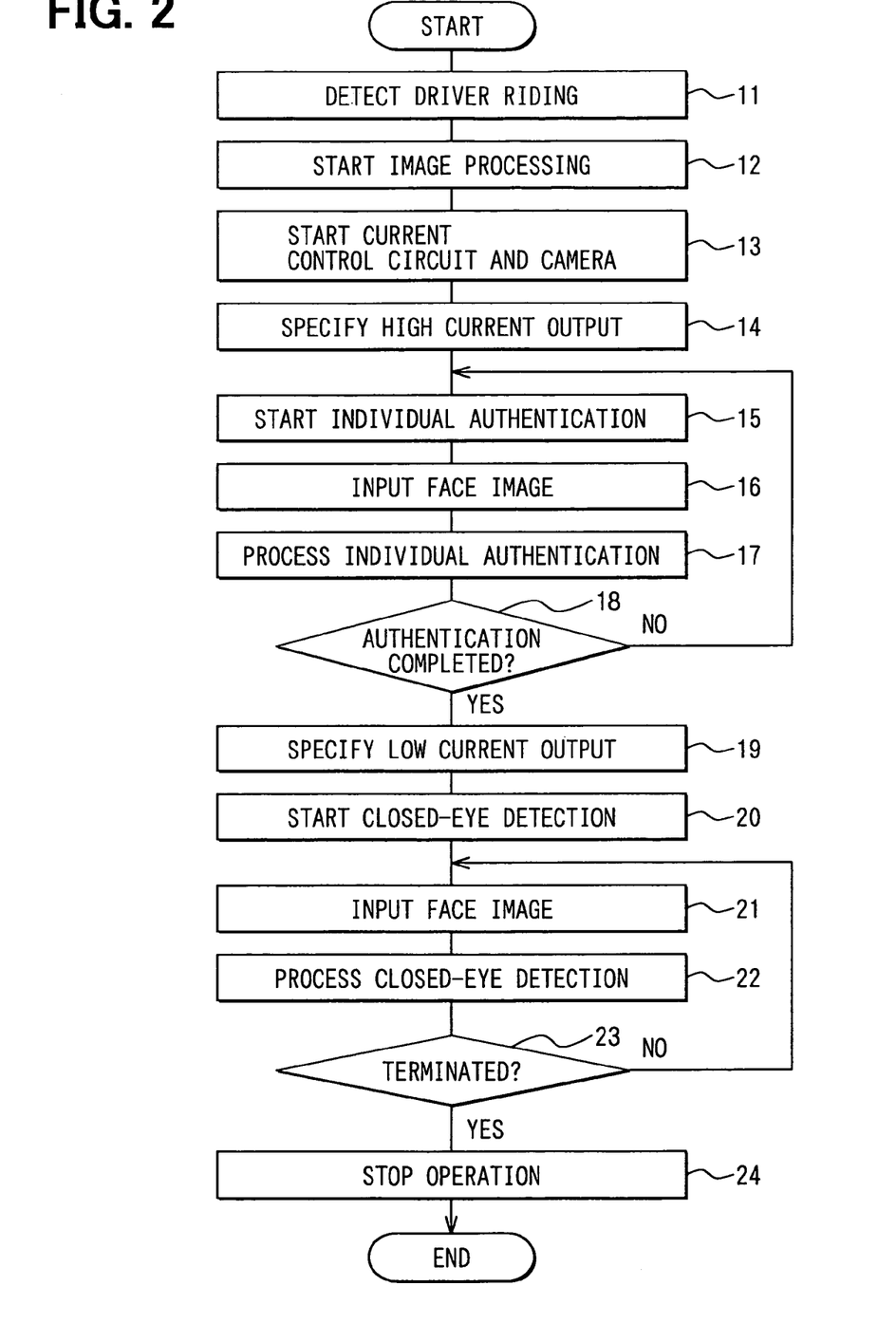
FIG. 2 is a flowchart of the prior art showing a driver's appearance recognition process according to the first embodiment.

The following describes operations of the driver's appearance recognition system according to the above-mentioned configuration. FIG. 2 shows a flowchart of the driver's appearance recognition process executed by the image processing circuit 5.

When a driver changes the door from the lock state to the unlock state, a door ECU supplies the image processing circuit 5 with a signal notifying this state change. Based on this signal, the image processing circuit 5 is supplied with power from the battery and becomes ready for operation. When the driver sits in the driver's seat thereafter, the weight detection switch 1 inputs a passenger detection signal to the image processing circuit 5 at Step 11.

At Step 12, the CPU of the image processing circuit 5, the DSP, and the like receive the passenger detection signal to start.

At Step 13, the CPU outputs a startup instruction signal to the camera 2 and the LED current control circuit 4. In accordance with this signal, the camera 2 and the LED current control circuit 4 start.

At Step 14, the CPU outputs an instruction signal to the LED current control circuit 4 so as to specify high current output. Upon reception of the instruction signal, the LED current control circuit 4 assigns a high current value to the setup value of a current supplied to the near infrared ray LED 3.

At Step 15, the individual authentication process starts. That is, the CPU outputs an instruction signal notifying acquisition of a driver's face image to the camera 2 and the near infrared ray LED 3. Consequently, the near infrared ray LED 3 radiates a near infrared ray to the driver's face. The camera 2 captures the driver's face.

At this time, the LED current control circuit 4 is set to the high current value. The near infrared ray LED 3 is supplied with a high current from the LED current control circuit 4. Therefore, the camera 2 can acquire the driver's face image under environment where the high illumination intensity is available.

At Step 16, the face image captured by the camera 2 is output from the camera 2 and is input to the image processing circuit 5.

At Step 17, the DSP executes the individual authentication process using the face image input to the image processing circuit 5. This face image process is similar to Non-Patent Document 1, for example. By receiving the instruction from the CPU, the DSP detects face's positions from the face image. The DSP detects a plurality of face's feature points as a range of the feature quantity to be detected. The DSP extracts the feature quantity specific to the driver from each feature point. The DSP collates the extracted feature quantity with the feature quantity previously stored in the memory.

At Step 18, it is determined whether or not the authentication is complete. That is, the DSP determines whether or not the collation at Step 17 succeeds.

When the DSP determines that the collation is successful, the CPU outputs an instruction signal to allow the engine to start to an engine ECU (not shown). This terminates the individual authentication process by the image processing circuit 5.

When the DSP determines that the collation is unsuccessful, the engine is not allowed to start. The process returns to Step 15 and repeats Steps 15 through 17 until the collation is determined to be successful at Step 18.

The collation may fail because of the illumination intensity of the face image captured by the camera 2. In such case, the CPU of the image processing circuit 5 outputs an instruction signal to the LED current control circuit 4. For example, this signal adjusts the current value of the current supplied to the near infrared ray LED 3 so as to be slightly higher or lower than the setup current value during the individual authentication.

This fine-adjusts the illumination intensity of the near infrared ray LED 3. The illumination intensity of the near infrared ray LED 3 is optimally adjusted for the individual authentication. Further, the CPU of the image processing circuit 5 outputs an instruction signal to the camera 2 to adjust a diaphragm of the camera 2. This can also adjust the face image's illumination intensity.

This fine-adjustment is performed not only at Step 18 where the collation is determined to be unsuccessful, but also at Step 16. That is, the memory previously stores the range of illumination intensity needed for face images used for the individual authentication process. The DSP determines whether or not the face image's illumination intensity input to the image processing circuit 5 is within the range of illumination intensity stored in the memory. When the DSP determines that the input face image's illumination intensity is inappropriate, the CPU outputs instruction signals to the LED current control circuit 4 and the camera 2. This adjusts the illumination intensity of the near infrared ray LED 3 and a diaphragm value of the camera 2.

When the authentication is determined to be successful at Step 18, the CPU outputs an instruction signal to allow the engine to start. At Step 19, the completion of the individual authentication process is followed by preparation of the closed-eye detection process.

The CPU outputs an instruction signal to the LED current control circuit 4 so as to output a low current. Receiving this instruction signal, the LED current control circuit 4 allocates a low current value as the setup value supplied to the near infrared ray LED 3.

At Step 20, the closed-eye detection process starts. The closed-eye detection process is repeated at a specified cycle while the driver is driving the vehicle.

Specifically, like Step 15, the CPU of the image processing circuit 5 outputs an instruction signal to the camera 2 and the near infrared ray LED 3 so as to notify acquisition of the driver's face image. Unlike Step 15, however, the near infrared ray LED 3 is supplied with a low current from the LED current control circuit 4 because the circuit 4 is set to the low current value.

At Step 21, the face image captured by the camera 2 is output from the camera 2 to the image processing circuit 5. The face image is input to the image processing circuit 5.

At Step 22, the DSP executes the closed-eye detection process using the face image input to the image processing circuit 5. The closed-eye detection process is similar to the process as described in Patent Document 2. The closed-eye detection process uses software that differs from the software used for the individual authentication process at Step 17.

For example, the DSP receives an instruction from the CPU of the image processing circuit 5 and detects the face position from the face image input from the camera 2. Further, the DSP extracts an eye section and detects the number of black pixels between upper and lower eyelids. At this time, the face position detection can use the result obtained at Step 16.

The DSP chronologically detects whether the driver's eye is opened or closed. Based on the chronologically detected state of the opened or closed eye, the DSP determines whether or not the driver is drowsy. This determination is performed periodically. Generally, when a person blinks, the eyelids are closed 0.1 second, for example. When the eyelids are closed 0.4 second or more, for example, the DSP determines the driver to be drowsy.

In addition, the DSP can be allowed to determine whether or not the driver is drowsy as follows. For example, the system measures the driver's blink speed and the period of time the eyes remain closed for five minutes from the time when the driver starts driving. The measurement result is previously stored in the memory of the image processing circuit 5. The DSP compares a detection result from the closed-eye detection process with the measurement result already stored in the memory. In this manner, it is possible to determine whether or not the driver is drowsy.

When the DSP determines that the driver is drowsy, the CPU receives a signal notifying this state and outputs an alarm instruction signal to a buzzer (not shown). The buzzer then sounds an alarm to alert the driver.

When the DSP determines that the driver is not drowsy, the CPU does not output the alarm instruction signal to the buzzer. The closed-eye detection process terminates in this cycle.

After the closed-eye detection process terminates for one cycle, the CPU of the image processing circuit 5 determines at Step 23 whether or not to terminate the closed-eye detection process itself. That is, it is determined whether or not the engine stops. At this time, it is determined whether or not an ignition switch supplies a signal to stop the engine. When the engine is determined to stop, the process proceeds to Step 24. When the engine is determined not to stop, the closed-eye detection process continues at Step 21.

At Step 24, the CPU outputs a stop instruction signal to the camera 2, the near infrared ray LED 3, the LED current control circuit 4, and the DSP. Consequently, the system stops and becomes standby. Let us assume that the driver opens the door, locks it, and leaves the vehicle. In this case, the door ECU inputs a signal to the image processing circuit 5 so as to notify the door is locked. The CPU issues an instruction to turn off the power of the system.

As mentioned above, the driver's appearance recognition system according to the embodiment comprises the camera 2, the near infrared ray LED 3, the LED current control circuit 4, and the image processing circuit 5.

The image processing circuit 5 has a function to execute the individual authentication process and the closed-eye detection process. The individual authentication process requires high illumination intensity for face images. The closed-eye detection process requires lower illumination intensity for face images than the individual authentication.

The LED current control circuit 4 receives an instruction signal from the image processing circuit 5 and performs the following functions. When the image processing circuit 5 executes the individual authentication process, the LED current control circuit 4 specifies a large current value of current supplied to the near infrared ray LED 3. When the image processing circuit 5 executes the closed-eye detection process, the LED current control circuit 4 specifies a smaller current value of current supplied to the near infrared ray LED 3 than that for the individual authentication process.

That is, when the image processing circuit 5 executes the individual authentication process, the system according to the embodiment can use the LED current control circuit 4 to supply a large current to the near infrared ray LED 3. This aims at increasing the illumination intensity when the camera 2 captures images. When the image processing circuit 5 executes the closed-eye detection process, the system according to the embodiment can use the LED current control circuit 4 to supply the near infrared ray LED 3 with the smaller amount of current than that for execution of the individual authentication process. This aims at providing the closed-eye detection process with the necessary illumination intensity when the camera 2 captures images.

A system having no current amount control means can only supply the specified amount of current to the near infrared ray LED. On the other hand, the embodiment can change current values in accordance with the functions of the image processing circuit 5. Compared to the system having no current amount control means, the embodiment can extend the service life of the near infrared ray LED 3.

The embodiment supplies a large amount of current to the image processing circuit 5 when it executes the individual authentication process. Since the individual authentication is executed once when the driver gets into the vehicle, and is completed in several seconds, it is considered that applying a large amount of current to the near infrared ray LED 3 causes little influence on the service life.

Second Embodiment

This embodiment adds a timer function to the image processing circuit 5 according to the first embodiment. That is, the second embodiment supplements the image processing circuit 5 with a function to monitor the continuation time of the individual authentication process. The timer measures a time lapse from Step 15.

The first embodiment described the example where the image processing circuit 5 executes the individual authentication process for the purpose of permitting the engine to start. The second embodiment will describe an example where the image processing circuit 5 executes the individual authentication process for the purpose of conforming the environment of in-vehicle units to user's requirements.

Figure 3:
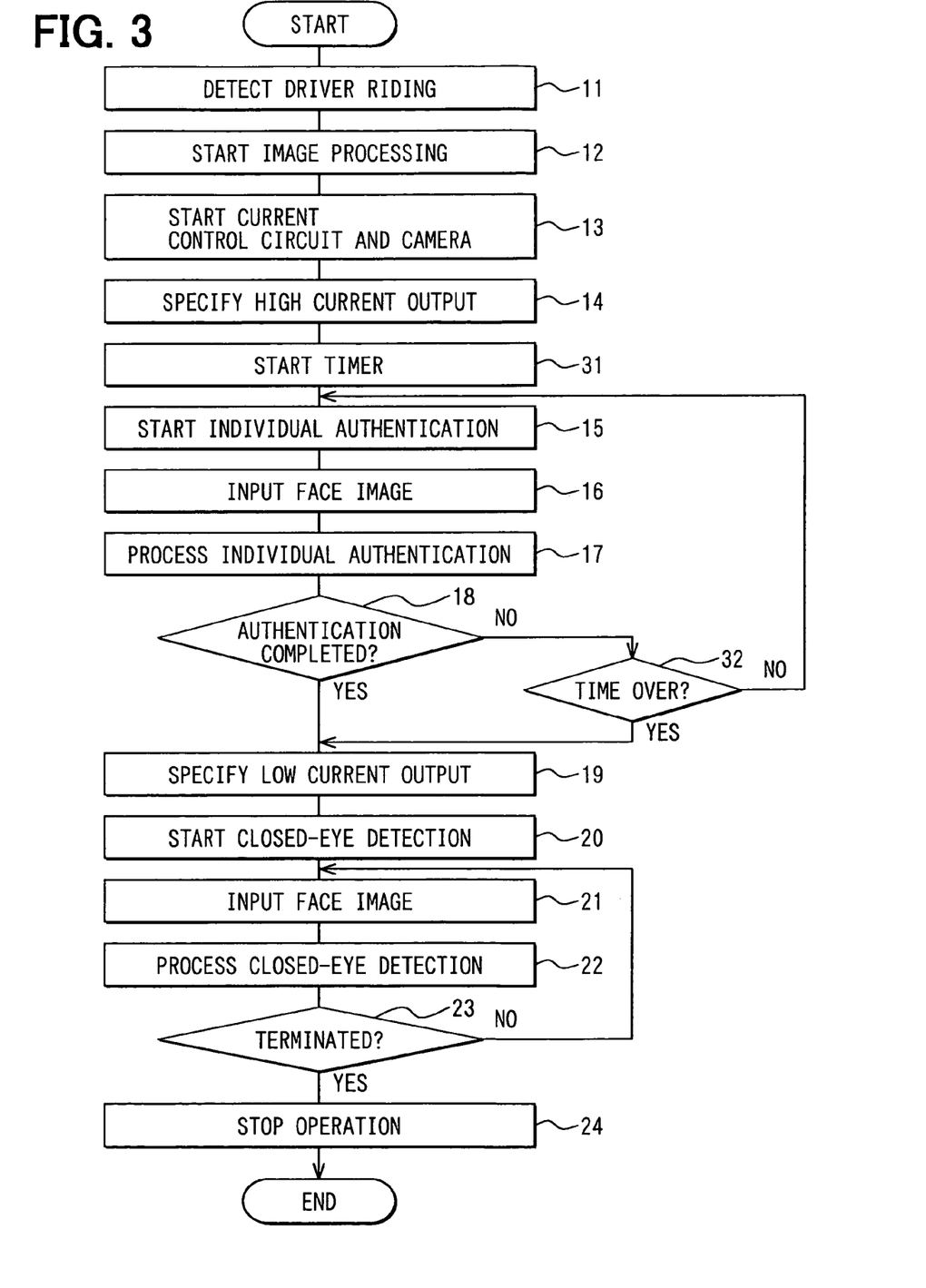
FIG. 3 is a flowchart showing a driver's appearance recognition process according to a second embodiment of the present invention.

FIG. 3 shows a flowchart of the driver's appearance recognition process executed by the image processing circuit 5 according to the second embodiment of the present invention.

The driver's appearance recognition process for the image processing circuit 5 according to this embodiment is supplemented with Steps 31 and 32 added to the process according to the first embodiment. Step 31 is added between Steps 14 and 15. Step 32 is added to determine a time over state when the determination at Step 18 results in No.

After execution of Step 14, a timer on the image processing circuit 5 starts at Step 31. Immediately after the timer starts, the individual authentication process starts at Step 15.

Steps 16, 17, and 18 are executed like the first embodiment. When the determination at Step 18 results in YES, the process proceeds to Step 19 like the first embodiment. When the determination at Step 18 results in NO, the process proceeds to Step 32.

At Step 32, the process determines whether or not the time measured by the timer reaches a specified time value. Any time value can be specified. The specified time value is previously stored in the image processing circuit 5. When the specified time value is not reached, the determination results in No. The process proceeds to Step 15 and repeats Steps 16 through 18.

When the time measured by the timer at Step 32 reaches the specified time value, the determination results in YES. The process proceeds to Step 19 without completing the individual authentication process. When the collation is unsuccessful after lapse of the specified time, the embodiment forcibly stops the individual authentication process and proceeds to the next step. The subsequent steps are the same as those for the first embodiment.

The timer is reset when the authentication is determined to be complete at Step 18 or when the time over state is determined at Step 32, i.e., when the individual authentication terminates.

Now, let us compare the second embodiment with the first embodiment. In the first embodiment, the image processing circuit 5 has no timer function. Accordingly, the individual authentication process is repeated from Steps 15 through 18 until the collation is determined to be successful at Step 18. Under this condition, a high current is applied to the near infrared ray LED 3. That is, the near infrared ray LED 3 is continuously subject to a high load. This is unfavorable from the viewpoint of extending the service life of the near infrared ray LED 3.

By contrast, as mentioned above, the second embodiment uses the timer on the image processing circuit 5 to monitor the continuation time of the individual authentication. When the individual authentication is not completed within a specified time, the individual authentication process is terminated.

In this manner, the second embodiment can help prevent the near infrared ray LED 3 from being continuously subject to a high load condition and deter the near infrared ray LED 3 from decreasing its service life. In other words, compared to the first embodiment, the second embodiment can extend the service life of the near infrared ray LED 3.

Third Embodiment

Figure 4:
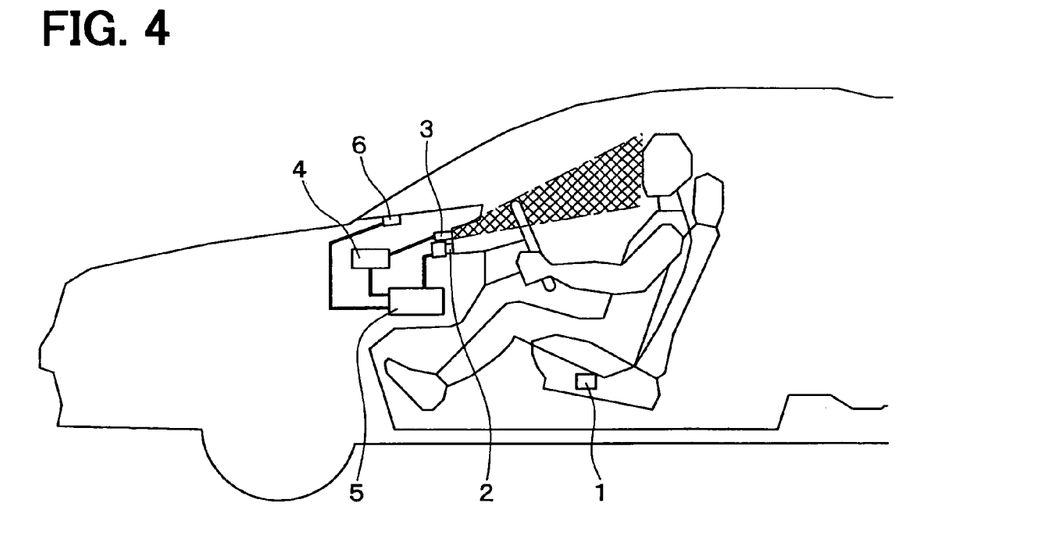
FIG. 4 shows the configuration of a driver's appearance recognition system according to a third embodiment of the present invention.

FIG. 4 shows the configuration of the driver's appearance recognition system according to a third embodiment of the present invention. When the driver drives the vehicle in the daytime, the outside light is normally radiated to the driver's face. When the near infrared ray LED 3 radiates the infrared light to the driver, the outside light and the infrared light from the near infrared ray LED 3 are radiated to the driver's face. When the outside light illuminance is high, sufficient illumination intensity is available from the driver's face despite reduction of the illumination intensity for the near infrared ray LED 3.

The third embodiment adds an outside light illuminance sensor 6 to the system according to the first embodiment of the present invention. The third embodiment further adds a control function to the image processing circuit 5 and the LED current control circuit 4 according to the first embodiment. This control function suppresses the amount of current supplied to the near infrared ray LED 3 in the case of high illuminance from the outside light illuminating the driver's face.

The outside light illuminance sensor 6 detects the illuminance of the outside light illuminating the driver's face. The outside light illuminance sensor 6 is disposed at a position capable of detecting the illuminance of the outside light illuminating the driver's face. As shown in FIG. 4, for example, the outside light illuminance sensor 6 is disposed at the top of the instrument panel. The outside light illuminance sensor 6 is configured to output a detection result to the image processing circuit 5.

Based on a detection result from the outside light illuminance sensor 6, the image processing circuit 5 outputs an instruction signal for setting the amount of current to the LED current control circuit 4 so as to optimize the amount of current supplied to the near infrared ray LED 3.

Figure 5:
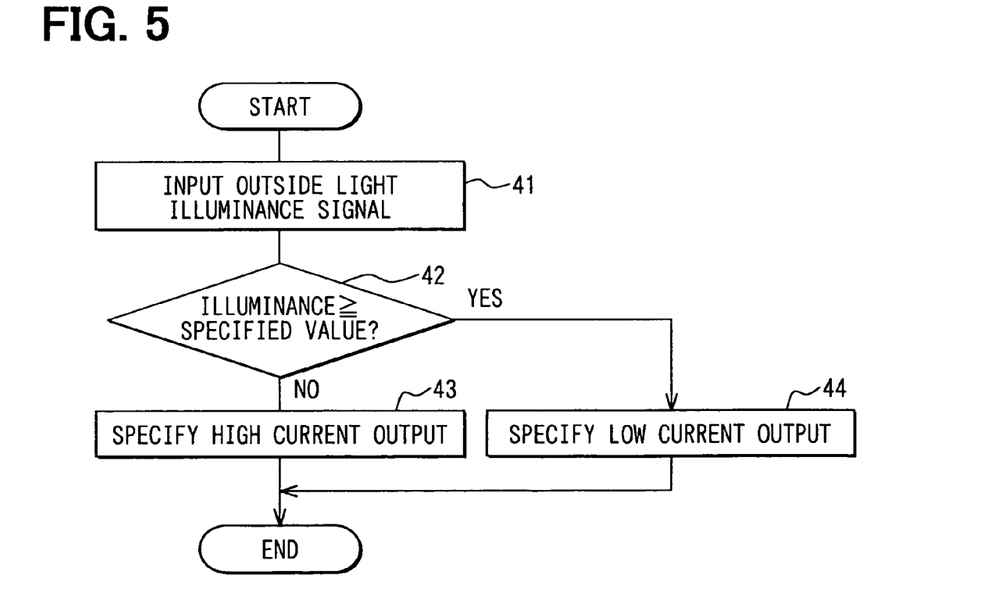
FIG. 5 is a flowchart showing a driver's appearance recognition process according to the third embodiment.

The following describes the driver's appearance recognition process executed by the image processing circuit 5. FIG. 5 shows part of a flowchart for the driver's appearance recognition process according to the third embodiment of the present invention.

The process according to the embodiment is represented by Steps 41 through 44 in FIG. 5 equivalent to a modification of Step 14 among the other steps described in the first embodiment.

After execution of Steps 11 through 13 in FIG. 2, the outside light illuminance sensor 6 outputs a detection result at Step 41 as shown in FIG. 5.

At Step 42, the process determines whether or not the detected illuminance supplied from the outside light illuminance sensor 6 is greater than or equal to a specified value.

When the illuminance supplied from the outside light illuminance sensor 6 is not greater than or equal to a specified value, the determination result is determined to be NO. The process proceeds to Step 43. At Step 43, the process outputs an instruction signal to the LED current control circuit 4 so that a high current should be output to the near infrared ray LED 3.

The LED current control circuit 4 receives this instruction signal and assigns a high current value to the setup value for the current supplied to the near infrared ray LED 3. Step 43 is the same as Step 14 in FIG. 2 referenced for the first embodiment. The above-mentioned high current value signifies the setup value for a current supplied to the near infrared ray LED 3 so as to obtain the illumination intensity needed to execute the individual authentication. The above-mentioned high current value is the same as that described in the first embodiment. Thereafter, the process proceeds to Step 15 in FIG. 2.

When the detected illuminance supplied from the outside light illuminance sensor 6 is greater than or equal to a specified value at Step 42, the determination result is determined to be YES. The process proceeds to Step 44. At Step 44, the process outputs an instruction signal to the LED current control circuit 4 so that a low current should be output to the near infrared ray LED 3.

The LED current control circuit 4 receives this instruction signal and assigns a low current value to the setup value for the current supplied to the near infrared ray LED 3.

The low current value is a current value that is lower than the high current value specified at Step 43. The low current value is configured so that the outside light and the infrared light from the near infrared ray LED 3 can provide the driver's face with the illumination intensity needed to execute the individual authentication. Any value can be assigned to the specified illuminance value to be used as the determination reference at Step 42. The low current value is determined based on this specified value. The process then proceeds to Step 15 in FIG. 2.

As mentioned above, the system according to the embodiment has the outside light illuminance sensor 6 to measure the illuminance near the driver's face. There may be a case of determining a high illuminance from the outside light illuminating the driver's face. In this case, the system controls the setup current value for the LED current control circuit 4 so that the image processing circuit 5 suppresses the amount of current supplied to the near infrared ray LED 3.

The first embodiment provides the system that always supplies a high current to the near infrared ray LED 3 during the individual authentication. By contrast, the third embodiment can decrease the current supplied to the near infrared ray LED 3.

As a result, the third embodiment can more reliably extend the service life of the near infrared ray LED 3 compared to the system provided by the first embodiment.

The third embodiment can extend the service life of the near infrared ray LED 3 also for the following reason. That is, the near infrared ray LED 3 is generally characterized in that a permissible current highly depends on the temperature. The higher the ambient temperature, the lower the permissible current. The permissible current signifies the amount of current allowed to be used for a specified period of time. For this reason, the service life of the near infrared ray LED 3 is extremely shortened when the near infrared ray LED 3 is used by supplying it with a current exceeding the permissible current.

When the temperature is high in an automobile body interior, it is necessary to suppress the amount of current supplied to the near infrared ray LED 3.

The automobile body interior temperature rises mainly due to incoming direct sunlight. When the intense outside light enters the automobile body interior, the interior temperature is considered to become high.

The embodiment lowers the specified current value for the LED current control circuit 4 when a detection result from the outside light illuminance sensor 6 exceeds the specified value, i.e., when the automobile body interior temperature is high.

Consequently, the third embodiment can extend the service life of the near infrared ray LED 3 by ensuring the sufficient illumination intensity on the driver's face.

A visible light cut filter can be attached to the outside light illuminance sensor 6 so as to improve the sensitivity of the outside light illuminance sensor 6 to near infrared components. For example, a visible light cut film can be used to cover the outside light illuminance sensor 6.

The third embodiment has described the example of replacing Step 14 in FIG. 2 referenced for the first embodiment with the steps as shown in FIG. 5. It is also possible to replace Step 19 in FIG. 2 with the steps as shown in FIG. 5 according to the third embodiment.

At Step 42, the image processing circuit 5 determines whether or not the detected illuminance is greater than or equal to the specified value. The image processing circuit 5 can be also allowed to simply determine whether or not the detected illuminance exceeds the specified value.

Other Embodiments (1) The above-mentioned embodiments have described the examples where the image processing circuit 5 has functions of the executing the individual authentication and the closed-eye detection. The individual authentication and the closed-eye detection are part of functions provided for the image processing circuit 5. The present invention is also applicable when the image processing circuit 5 has the other functions.

That is, the image processing circuit 5 may have a plurality of functions that execute appearance recognition processes to recognize the driver's appearance using face images. These appearance recognition processes may need different illumination intensities on the driver's face. In such case, the present invention is also applicable.

As such functions, the image processing circuit 5 has the functions of executing the individual authentication and the closed-eye detection. Further, the image processing circuit 5 can also have a function of detecting driver's face directions to prevent the driver from looking aside and a function of detecting pupil's directions, for example.

For example, the former function detects positions of eyes and nose from a driver's face image captured by the camera 2. The detection result is used to further detect a distance between eyes and a triangular shape formed by connecting positions of two eyes and the nose.

When the camera 2 captures the driver's face from the front, a face image captured by the camera 2 is characterized as follows. The distance between two eyes is longer on the driver's face directed front than that on the driver's face directed sideways. The system forms different triangles by connecting positions of driver's two eyes and nose depending on whether his or her face is directed front or sideways.

The system detects directions of the driver's face based on distances between the eyes and changes in the triangular shape. As a result, the system determines whether or not the driver looks aside.

The latter function detects eye positions from driver's face images captured by the camera 2, for example. The detection result is used to further detect positions of the tail and the head of the eye and the pupil. This detection result is further used to detect where the pupil's center is directed, i.e., the pupil's direction. Based on this result, it is determined whether or not the driver looks aside.

These functions are common to each other with respect to the use of a face image, but differ in portions extracted from the face image. When these functions are compared strictly, the image processing circuit 5 executes these functions that use different illumination intensities needed for face images.

Therefore, the present invention is applicable when the image processing circuit 5 has at least two of these functions.

When the above-mentioned four functions are roughly compared, particularly the function of performing the individual authentication needs to precisely detect face image's feature quantities as mentioned above. In contrast, the remaining three functions need not precisely detect face image's feature quantities and just need to be able to detect outlines, positions, and the like of face parts.

Of the above-mentioned four functions, the function of performing the individual authentication needs the highest illumination intensity. Compared to the function of performing the individual authentication, the remaining three functions need lower illumination intensities.

Consequently, the present invention can provide the maximum effect when it is applied to a system in which the image processing circuit 5 has the function of executing the individual authentication and any of the other functions as mentioned above.

(2) The above-mentioned embodiments use the closed-eye detection method of determining eye opening or closing based on the number of continuous black pixels between upper and lower eyelids. The other methods can be employed. For example, another closed-eye detection method can determine eye opening or closing by detecting an iris as described in BACKGROUND OF THE INVENTION of Patent Document 2.

(3) In FIGS. 1 and 4, the LED current control circuit 4 and the image processing circuit 5 are described as independent apparatuses. It is also possible to build the LED current control circuit 4 and the image processing circuit 5 into one electrical control unit.

(4) The above-mentioned embodiments provide the example of using the weight detection switch 1 as riding detection means. The present invention is not limited thereto and permits the other means to be used. For example, an infrared ray sensor disposed on the instrument panel can be used as the riding detection means.

(5) The above-mentioned embodiments provide the example of hiding the camera 2 in the instrument panel. The camera 2 can be provided in a room mirror.

(6) The above-mentioned embodiments provide the example of using the near infrared ray LED 3 to radiate the infrared light. It is also possible to allow the LED to radiate not only the infrared light, but also light belonging to the infrared ray wavelength region.

(7) The above-mentioned embodiments provide the example of using the near infrared ray LED 3 as the infrared light radiation means. The other infrared light radiation means can be used if they radiate infrared rays and change the illumination intensity according to the amount of current supplied. For example, an incandescent lamp can be used as the infrared light radiation means.

It will be obvious to those skilled in the art that various changes may be made in the above-described embodiments of the present invention. However, the scope of the present invention should be determined by the following claims.

What is claimed is:

1. A driver's appearance recognition system comprising:
a camera which captures a face image of a driver's face;
infrared light radiation means for radiating an infrared ray to the driver's face and changing illumination intensity according to the amount of supplied current when the camera captures the face image;

appearance recognition control means for, based on a face image captured by the camera, executing a first driver's appearance recognition process to recognize a driver's appearance and a second driver's appearance recognition process different from the first driver's appearance recognition process and for controlling the camera and the infrared light radiation means;

current amount control means for providing control
that a first setup value is defined for a setup value of current supplied to the infrared light radiation means when the appearance recognition control means executes the driver's appearance recognition process and
that a second setup value different from the first setup value is defined for a setup value of current supplied to the infrared light radiation means when the appearance recognition control means executes the second driver's appearance recognition process; and riding detection means for detecting that a driver gets into a vehicle, wherein the appearance recognition control means includes:
first output means for outputting an instruction signal to the current amount control means notifying that a setup value for current supplied to the infrared light radiation means is defined as the first setup value when the riding detection means inputs a signal notifying that a driver gets into a vehicle;
first execution means for executing the first driver's appearance recognition process using the face image captured by the camera under condition that the infrared light radiation means is supplied with current from the current amount control means configured to the first setup value;
determination means for determining whether or not the first execution means completes the first driver's appearance recognition process;
second output means for outputting an instruction signal to the current amount control means notifying that a setup value for current supplied to the infrared light radiation means is defined to be the second setup value lower than the first setup value when the determination means determines that the first driver's appearance recognition process is complete; and
second execution means for executing the second driver's appearance recognition process using the face image captured by the camera under condition that the infrared light radiation means is supplied with current from the current amount control means configured to the second setup value.

2. The driver's appearance recognition system of claim 1, wherein the appearance recognition control means includes:
time measurement means for starting time measurement when the first execution means starts the first driver's appearance recognition process; and
stop means for determining whether or not the time measured by the time measurement means exceeds specified time when the determination means determines that the first driver's appearance recognition process is not complete and for stopping the first execution means when the measured time exceeds the specified time.

3. The driver's appearance recognition system of claim 1, further comprising:
outside light illuminance detection means for detecting illuminance of outside light radiated near a driver's seated position and for outputting a detection result to the appearance recognition control means,
wherein the appearance recognition control means includes:
third output means for outputting an instruction signal to the current amount control means notifying that a setup value for current supplied to the infrared light radiation means is defined to be a third setup value when a detection result input from the outside light illuminance detection means does not exceed a specified value; and
fourth output means for outputting an instruction signal to the current amount control means notifying that a setup value for current supplied to the infrared light radiation means is defined to be a fourth setup value smaller than the third setup value when a detection result input from the outside light illuminance detection means exceeds the specified value.

4. The driver's appearance recognition system of claim 1, wherein the appearance recognition control means executes, as the first driver's appearance recognition process, an individual authentication process which detects a face's feature point from the face image, detects a feature quantity at the feature point, and collates the feature quantity with a previously registered feature quantity.

* * * * *